United States Patent [19]
Takahashi

[11] Patent Number: 5,347,309
[45] Date of Patent: Sep. 13, 1994

[54] IMAGE CODING METHOD AND APPARATUS

[75] Inventor: Toshiya Takahashi, Takatsuki, Japan

[73] Assignee: Matsushita Electric Industrial Co., Ltd., Osaka, Japan

[21] Appl. No.: 871,697

[22] Filed: Apr. 21, 1992

[30] Foreign Application Priority Data

Apr. 25, 1991 [JP] Japan .................................. 3-095807
Jun. 17, 1991 [JP] Japan .................................. 3-144445

[51] Int. Cl.$^5$ ............................................ H04N 7/137
[52] U.S. Cl. .................... 348/401; 348/420
[58] Field of Search .................. 358/136, 133, 105; 348/401, 420

[56] References Cited

U.S. PATENT DOCUMENTS

| | | | |
|---|---|---|---|
| 4,837,618 | 6/1989 | Hatori et al. | 358/136 |
| 4,849,812 | 7/1989 | Borgers et al. | 358/133 |
| 4,933,763 | 6/1990 | Cantelou | 358/136 |
| 4,984,076 | 1/1991 | Watanabe et al. | 358/133 |
| 5,091,782 | 2/1992 | Krause et al. | 358/136 |
| 5,128,757 | 7/1992 | Citta et al. | 358/133 |
| 5,168,357 | 12/1992 | Kutka | 358/136 |

FOREIGN PATENT DOCUMENTS

| | | |
|---|---|---|
| 0395271 | 10/1990 | European Pat. Off. . |
| 0412713 | 2/1991 | European Pat. Off. . |
| 0424060 | 4/1991 | European Pat. Off. . |
| 0490799 | 6/1992 | European Pat. Off. . |
| 0499307 | 8/1992 | European Pat. Off. . |
| 0508351 | 10/1992 | European Pat. Off. . |

OTHER PUBLICATIONS

Philips Journal of Research, vol. 44, No. 2/3, Jul. 28, 1989, Eindhoven, NL, pp. 345–364, XP53343, P. H. N. De With "Motion-Adaptive Intraframe Transform Coding of Video Signals", *paragraph 3*.

Study Group XV—Report R 37, International Telegraph and Telephone Consultative Committee (CCITT), Aug. 1990.

"Block Adaptive Frame/Field DCT Coding Decided by the Vertical Difference Test", Robert Kutka, Munich, 83, Sections 1–7.

Patent Abstract of Japan, vol. 11, No. 33, (E-476), Jan. 30, 1987 & JP-A-61 201 580, (Toshiba Corp.), Sep. 6, 1986 *abstract*.

Patent Abstract of Japan, vol. 8, No. 247, (E-278), Nov. 13, 1984 & JP-A-59 123 370, (Sony K.K.), Jul. 17, 1984 *abstract*.

Patent Abstract of Japan, vol. 12, No. 362, (E-663), Sep. 28, 1988 & JP-A-63 115 481, (Mitsubishi Electric Corp.), May 20, 1988 *abstract*.

1990 IEEE International Symposium on Circuits and Systems, vol. 2, May 1, 1990, New Orleans, La., U.S.A., pp. 1306–1309, XP167049, F. M. Wang et al., "Time-Recursive Deinterlacing for IDTV and Pyramid Coding", *paragraph 3-paragraph 5; FIG. 5*.

Patent Abstract of Japan, vol. 13, No. 53, (E-713), Feb. 7, 1989 & JP-A 63 245 188, (Mitsubishi Electric Corp.), Oct. 12, 1988 *abstract*.

Primary Examiner—Tommy P. Chin
Assistant Examiner—Bryan S. Tung
Attorney, Agent, or Firm—Wenderoth, Lind & Ponack

[57] ABSTRACT

An inter-field motion vector of an interlaced scanned inputted image is detected, and, using the detected inter-field motion vector, movements between fields are compensated to constitute a frame. The frame is then subjected to block coding. Alternatively, an interlaced scanned input image is subjected to two-dimensional block division and further an activity of each two-dimensional block is calculated. Using the activity as an index, the two-dimensional block is divided into either field small blocks constituted by field data or frame small blocks constituted by frame data, and the divided small blocks are coded. By these steps, even an image having large motion does not invite degradation of image quality, and high efficiency image coding can be realized.

6 Claims, 8 Drawing Sheets

IMAGE CODING METHOD AND APPARATUS

BACKGROUND OF THE INVENTION

1. Field of the Invention

The present invention relates to an image coding method and apparatus to be used for compressing and transmitting or recording a digital image.

2. Description of the Prior Art

The transfer rate of digital images reaches several hundred Mbps to several Gbps, and there arise restrictions such as communication cost in transmitting and recording capacity cost in recording, and so on. Accordingly, hitherto there have been developed an image coding method and apparatus designed to lower the transfer rate while maintaining the degradation of the image quality to the minimum extent.

Hereinafter there will be described the image coding method of CCIR H.261 specification which is an example of the conventional image coding methods as mentioned above.

The objective input is a non-interlaced image which is called a CIF format. FIG. 10 shows a time-space diagram of the pixels of the input image. In the diagram, the abscissa shows the direction of time and the ordinate shows the vertical direction, i.e., line direction. In the diagram, the group of the pixels having a same time axis is called a CIF frame, and the coding is carried out in units of CIF frames.

The first CIF frame to be coded, i.e., the image of frame t, is subjected to intra-frame coding. That is to say, the image data is first divided into two dimensional blocks of 8×8 pixels and converted to transform coefficients in the unit of each two dimensional block by DCT (Discrete Cosine Transform). Next, the transform coefficients are quantized and sent out to the transmission line. In general, since the images have high correlations, and when they are subjected to DCT, the energies of the images having been subjected to DCT are concentrated on the transform coefficients corresponding to the low frequency components. Accordingly, by carrying out quantizing in such a manner as to roughly quantize the visually less significant high frequency components and finely quantize the low frequency components, which are the important components, it becomes possible to limit the degradation of image quality to a minimum extent and to reduce the data amount (cf CCITT Recommendation H.261, "Video coder for audiovisual services at px64 kbits/s", Geneva 1990)

However, the above-mentioned image coding method cannot efficiently code the interlaced scanned image inputs. At present, the generally used images are interlaced scanned. FIG. 11 is a time-spaced diagram of the pixels of the interlaced images. The pixels are arranged by interlacing to the time-shifted positions every vertical line. In the figure, in general, the group of the pixels having a same time axis is called a field, and a combination of the two fields having different time axes is called a frame. A frame is constituted by a field 1 and a field 2. To the input of FIG. 11, the conventional image coding method is applicable on a field by field basis, but in such case the correlations between fields, i.e., the vertical correlations, cannot be utilized, so that the coding efficiency is low. The field 1 and the field 2 have different time-space positions from each other, but in general have high correlations. For example, in the still image, the image does not change with time. When the points x, y and z in FIG. 11 are assumed, the correlation between the points x and y is higher than that between the points x and z. Therefore, next there is consideration to combine the field 1 with the field 2 to make a frame, and to carry out coding on the combined frame by frame basis. FIG. 12 is an example of having formed a frame by combining the fields, being expressed as a vertical and horizontal two-dimensional plane. In the figure, a triangle is panned from left to right. The frame formed by simply combining the fields has problematic points such that, in the case of the images having large movements, as in the hypotenuse of the triangle in the figure, there arises a part which shows degradation of correlations in the vertical direction, thereby providing a cause for the degradation of the image quality in coding.

SUMMARY OF THE INVENTION

An object of the present invention is to provide an image coding method and apparatus having high efficiency irrespective of the quantity of motion.

In order to attain the above object, according to an image coding method of the present invention, an interlaced scanned image data is inputted, an inter-field motion vector of the foregoing image data is detected, an inter-field motion compensation is carried out by using the inter-field motion vector to construct a motion compensated frame, and the motion compensated frame is subjected to block coding.

Alternatively, an interlaced scanned image data is inputted, the image data is divided into two-dimensional blocks, an activity of each of the two-dimensional blocks is calculated, and, using the activity as an index, each two-dimensional block is divided into either field small blocks constituted by field data or frame small blocks constituted by frame data, and the divided small blocks are coded.

By the method as described above, inter-field motion compensation is carried out to enhance the vertical correlation, after which coding is carried out on a frame by frame basis. Accordingly, even if there is a motion between fields, efficient coding is possible. Further, in a part having a large motion, coding of field small blocks is carried out, and in a motionless part, coding of frame small blocks utilizing the vertical correlation is carried out.

Accordingly, highly efficient image coding corresponding to a local motion can be realized.

DESCRIPTION OF THE PREFERRED EMBODIMENTS

Hereinafter, an image coding method and apparatus in an embodiment of the present invention will be described with reference to the drawings.

Figure 1:
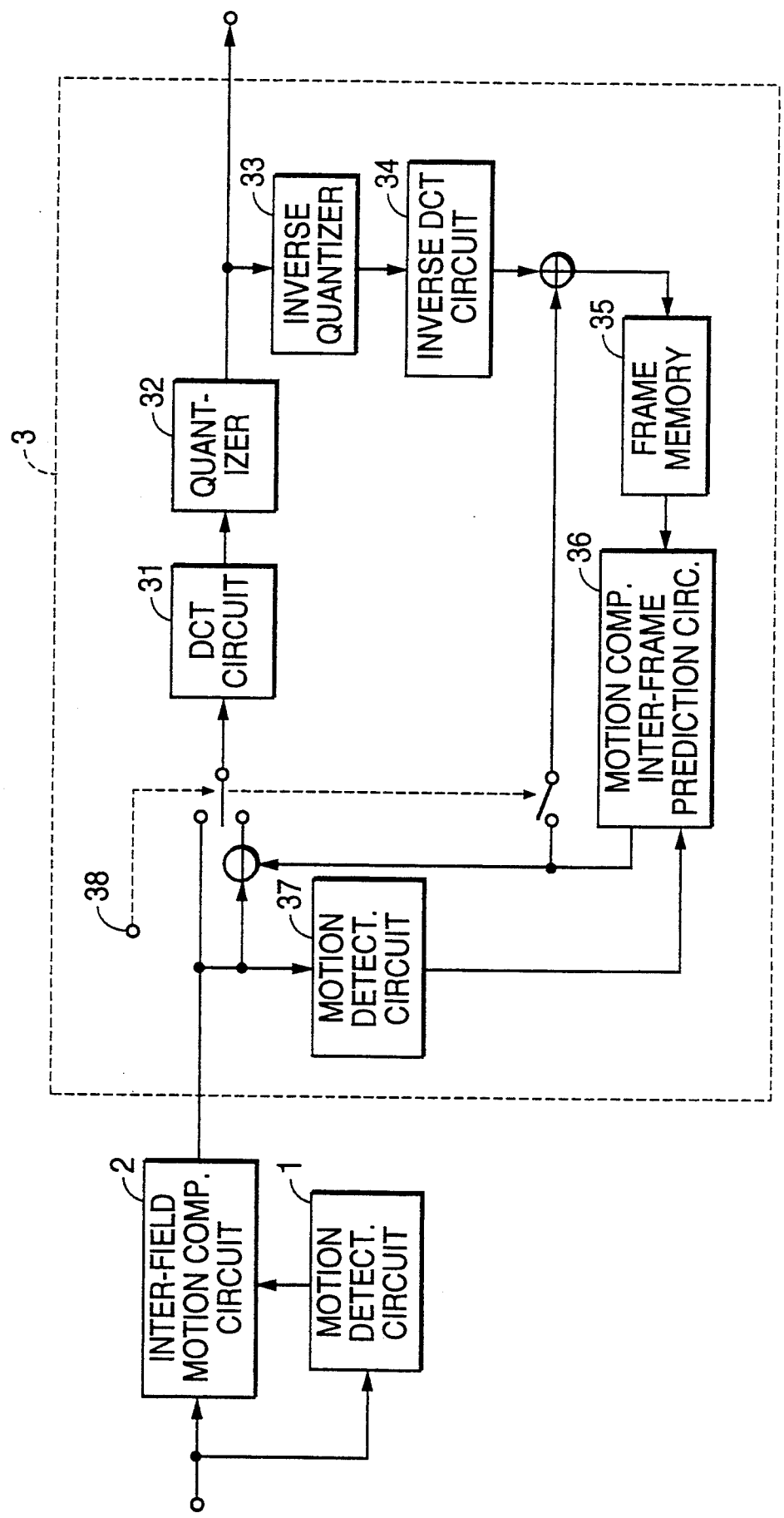
FIG. 1 is a block diagram of an image coding apparatus in a first embodiment of the present invention.

In FIG. 1, the numeral 1 denotes a motion detection circuit, 2 denotes an inter-field motion compensation circuit, and 3 denotes a block coding circuit.

Figure 2:
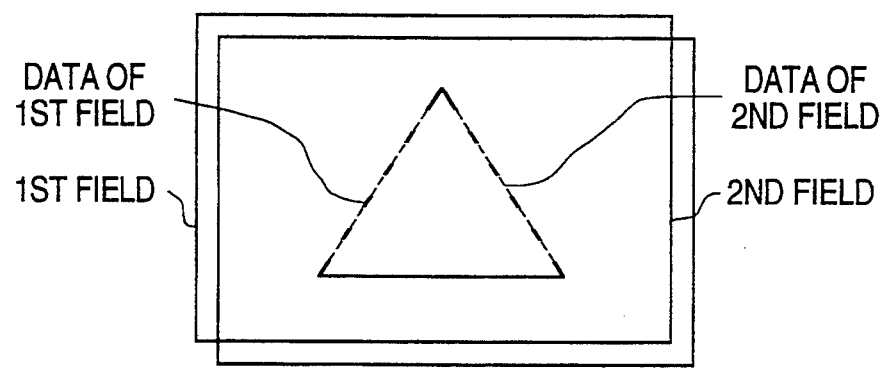
FIG. 2 is an illustration of an inter-field motion compensation in the first embodiment of the present invention.

With respect to the image coding apparatus constituted as above, explanation will be given below by using FIG. 1 and FIG. 2.

For the inputted image, inter-field motion vectors are obtained on a block by block basis in the motion detection circuit 1 by a block matching method. Next, the obtained motion vectors of all blocks in each field are averaged, and the average value is taken as an inter-field motion vector. The inter-field motion compensation circuit 2 carries out inter-field motion compensation by using the inter-field motion vector to make a motion compensated frame. FIG. 2 is an example of the motion compensated frame, in which a motion of an object between fields is compensated to constitute a highly vertically correlated frame. The block coding circuit 3 subjects the motion compensated frames to block coding on a frame by frame basis. In FIG. 1, there is used as a block coding circuit an inter-frame differential two-dimensional DCT coding apparatus similar to that of the conventional example.

The block coding circuit 3 comprises a DCT circuit 31, a quantizer 32, an inverse quantizer 33, an inverse DCT circuit 34, a frame memory 35, a motion compensation inter-frame prediction circuit 36, a motion detection circuit 37, and an intra-frame/inter-frame switching signal input terminal 38.

The image data of the first motion compensated frame to be coded (a frame inputted at the time t, being called a t-frame) are transformed into transform coefficients in the DCT circuit 31 on a certain block by block basis. The transform coefficients are quantized with a quantizer 32 and sent to the transmission line. The transform coefficients sent out to the transmission line are simultaneously reverted to the real time data through the inverse quantizer 33 and the inverse DCT circuit 34 and stored in the frame memory 35.

On the other hand, the images of the subsequent frames including t+1 frame are subjected to inter-frame differential coding. First, in the motion detection circuit 37, using for example a well known full search method, an vector is obtained On a block by block basis. The motion compensation inter-frame prediction circuit 36 forms a motion compensated prediction of the next frame on a block by block basis by using the detected motion vector. With respect to the image data of the t+1 frame, a difference from the prediction formed from the t-frame, i.e. a prediction error, is calculated and coded in the same method as applied to the t-frame. With respect to the following frames including t+2 frame, prediction errors are coded in the same method as in the t+1 frame.

The above-mentioned operations are all the processings on a frame by frame basis. Compared with the processings on a field by field basis, in the processing on a motion compensated frame by frame basis, the inter-pixel distance in the vertical direction becomes ½, and so the correlations become higher and the energies of the transformed coefficients concentrate on the lower frequency region. As a result, there can be obtained a high efficiency coding apparatus. Further, as the inter-field motion compensation is carried out, coding efficiency is not lost even against the images having large motion.

Figure 3:
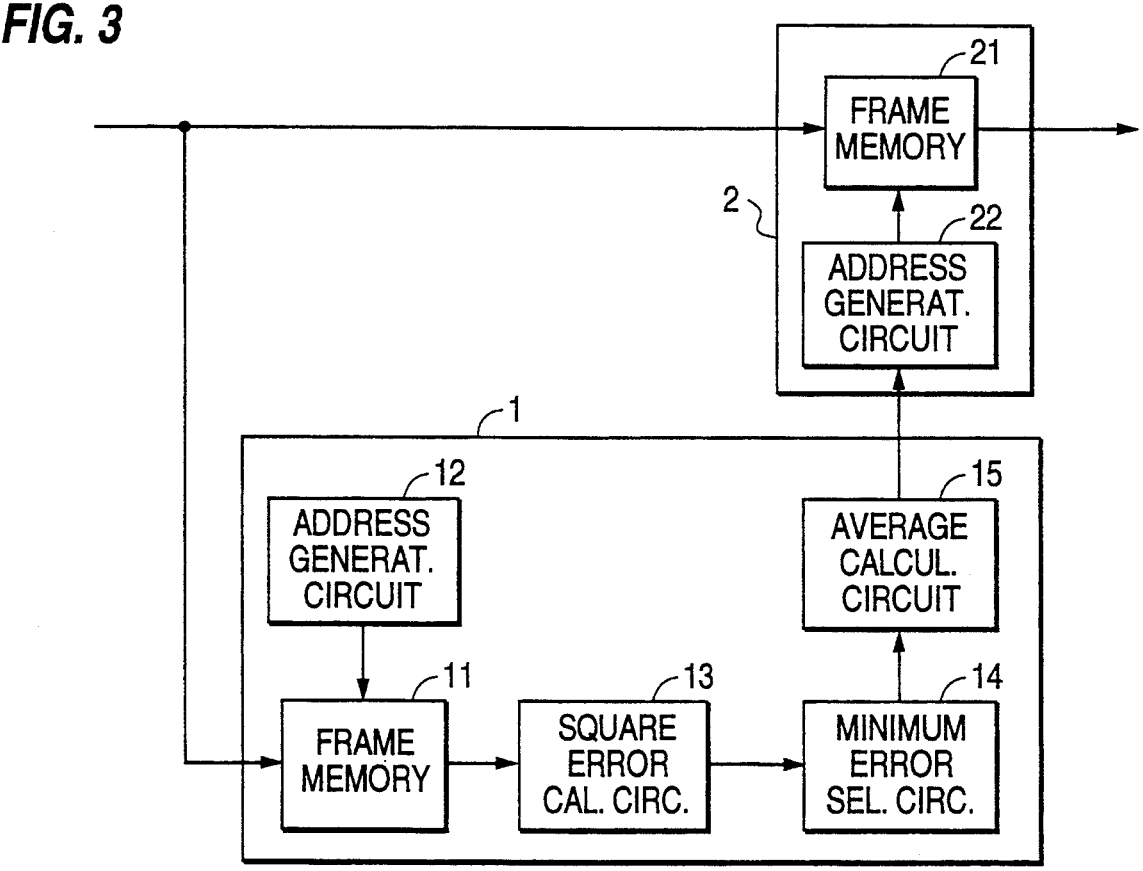
FIG. 3 is a detailed block diagram of a motion detection circuit and an inter-field motion compensation circuit of the present invention.

FIG. 3 shows an example of a detailed constitution of the motion detection circuit 1 and inter-field motion compensation circuit 2. The motion detection circuit 1 is constituted by a frame memory 11 for storing the inputted image and an address generating circuit 12 for generating an address of the memory 11, a square error calculation circuit 13 for calculating square errors between the blocks of the different fields, a minimum error selection circuit 14 for outputting as the motion vector a block address in a block having a smallest error out of the square errors calculated by the square error calculation circuit 13, and an average value calculation circuit 15 which inputs the motion vector of each block generated in the minimum error selection circuit 14, averages the motion vectors of all blocks in the field and outputs the inter-field motion vectors. Further, the motion compensation circuit 2 is constituted by a frame memory 21 and an address generating circuit 22. The inter-field motion compensation is realized by inputting the motion vector produced by the motion detection circuit 1 to the address generating circuit 22 as an offset, and shifting the entire field 2 in reading out the image stored in the frame memory 21.

Figure 4:
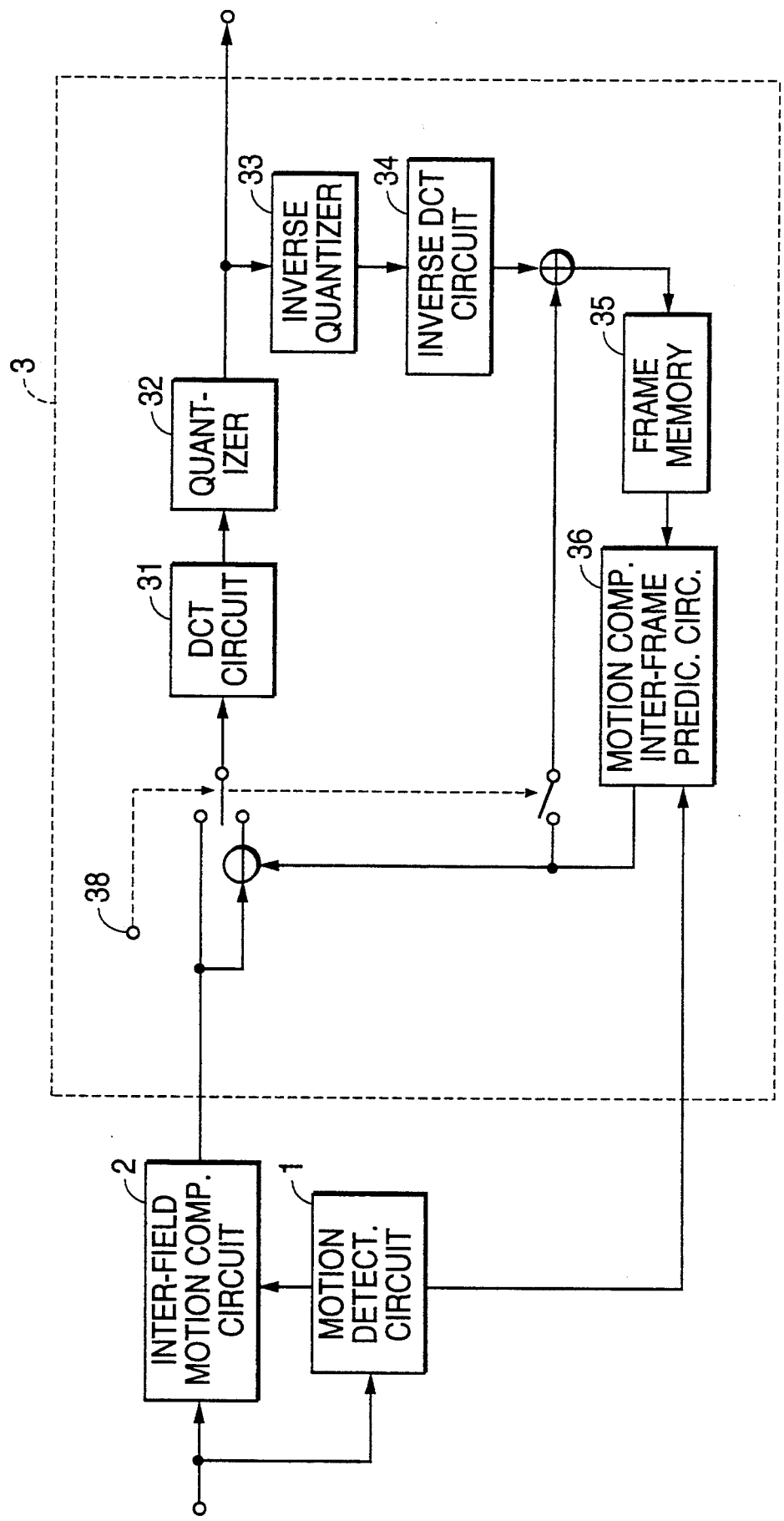
FIG. 4 is a block diagram of an image coding apparatus in a second embodiment of the present invention.

FIG. 4 is a block diagram of an image coding apparatus in the second embodiment of the present invention. The difference of this embodiment from the first embodiment is in the point of the co-use of the motion detection circuit 1 with the motion detection circuit 37 in the block coding circuit 3. In the second embodiment, the inter-frame motion is to be detected by the motion detection circuit 1. The inter-field motion vector is obtained by detecting inter-frame motion vectors of all blocks in a frame, averaging the detected inter-frame motion vectors of all blocks in the frame, and dividing the average value by 2. by constituting as above, approximately the same effect as that of the first embodiment can be obtained with less hardware without the necessity to provide the different circuits for inter-field and inter-frame, though precision is slightly inferior to the case of directly obtaining the inter-field motion vector.

The above embodiments have been explained taking an example of the inter-frame differential two-dimensional DCT coding method as a block coding, but the block coding is not limited to the embodiment. Any other block coding can be used such as three-dimensional DCT, vector quantization, and the like.

Although, in the foregoing embodiments, the inter-field motion vector was obtained by averaging the motion vectors of all blocks in the field or frame, the system is not limited to the embodiments, but various other methods can be utilized such as to take a middle value, or to calculate the histogram of the motion vectors of all blocks and take an average by using only several frequently occurring motion vectors, or to detect only one inter-field motion vector from the first by deeming a field or a frame as one block, or the like.

Hereinafter, an image coding method and apparatus in the third embodiment of the present invention will be described with reference to the drawings.

Figure 5:
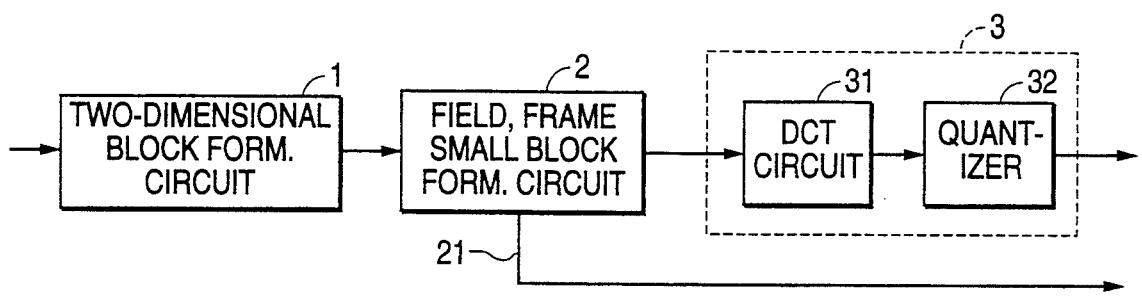
FIG. 5 is a block diagram of an image coding apparatus in a third embodiment of the present invention.

In FIG. 5, the numeral 1 denotes a two-dimensional block forming circuit, 2 denotes a field, frame small block forming circuit, and 3 denotes a block coding circuit which is constituted by a DCT circuit 31 and a quantizer 32.

With respect to the image coding apparatus constituted as above, explanation will be given below by using FIGS. 5, 6, 7 and 8.

Figure 6:
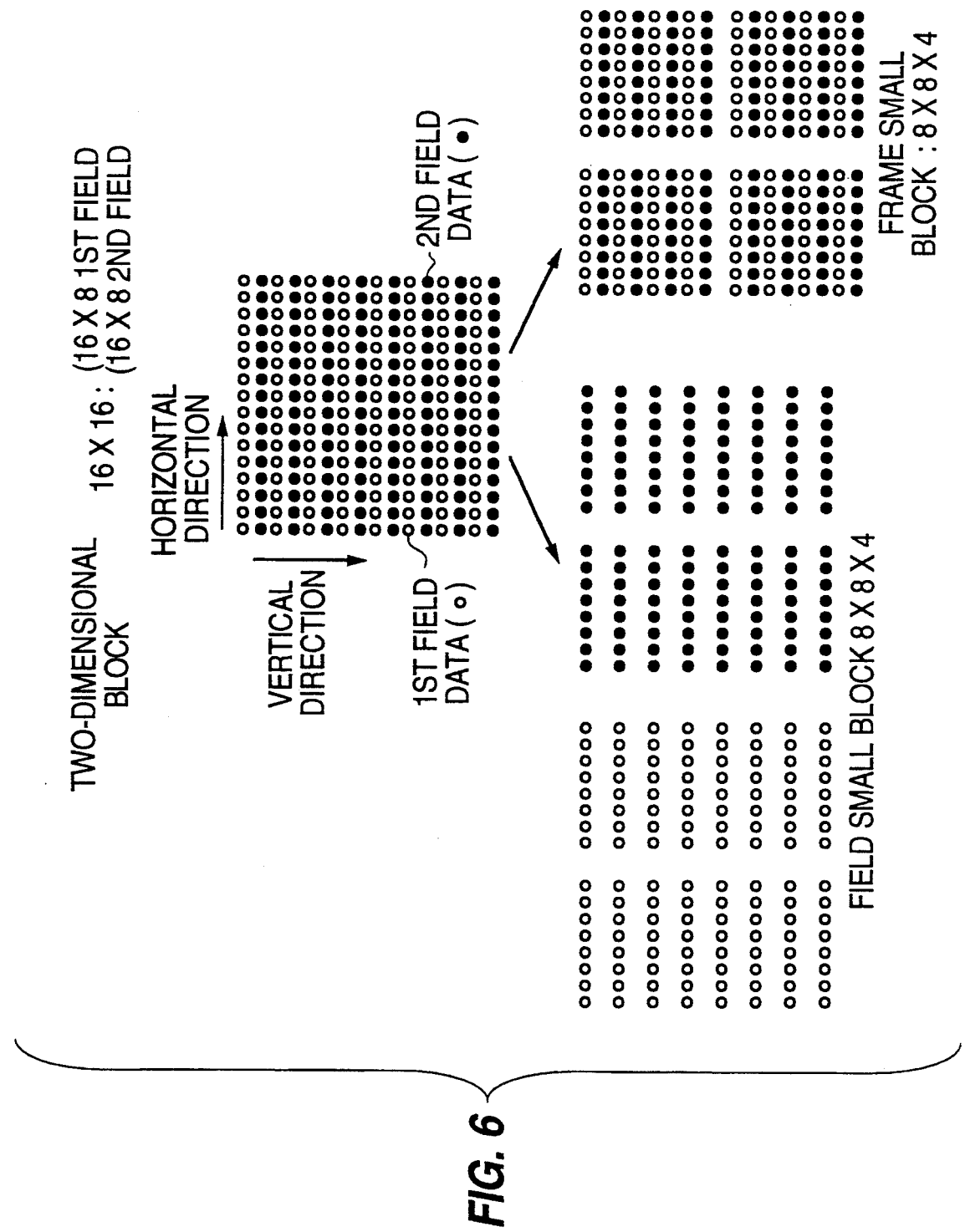
FIG. 6 is a diagram for explaining a method of forming the field and frame small blocks of the present invention.

The inputted image is divided into two-dimensional blocks of certain size in the two-dimensional block forming circuit 1. Here, it is assumed as an example that each two-dimensional block has 16 (horizontal)×16 (vertical) pixels. The field, frame small block forming circuit 2 inputs the above 16×16 two-dimensional blocks, and first divides each of them into four field or frame small blocks, each having 8×8 pixels. FIG. 6 is an example of division. The 16×16 two-dimensional block consists of a first field two-dimensional block of 16×8 pixels and a second field two-dimensional block of 16×8 pixels. The field small blocks consist of two small blocks of 8×8 pixels constituted only by the data of the first field, and two small blocks of 8×8 pixels constituted only by the data of the second field, or four small blocks in total. On the other hand, the frame small blocks consist of four small blocks of 8×8 pixels formed by combining the data of the first field and second field taken alternatively line by line.

Next, the field, frame small block forming circuit 2 selects either the field small blocks or the frame small blocks by using an activity as an index, and outputs the selected small blocks. The activity is calculated in the following manner. Now, assume each pixel value in each field small block to be $Sbi(x,y,n)$ (x: horizontal pixel address, $1 \leq x \leq 8$, y: vertical pixel address, $1 \leq y \leq 8$, n: small block address, $1 \leq n \leq 4$). First, an average pixel value $mi(n)$ of each small block is obtained. Next, using the average pixel value $mi(n)$, an AC energy of each small block is obtained, and a sum of the AC energies of all field small blocks is calculated as a total AC energy, Ei, of the field small blocks. Ei can be expressed by equation, as follows:

$$Ei = \sum_{n=1}^{4} \sum_{x=1}^{8} \sum_{y=1}^{8} (Sbi(x,y,n) - mi(n))^2$$

A total AC energy, Er, of the frame small blocks is also calculated in the similar manner, and a difference between Ei and Er, obtained as above (Ei−Er), is taken as the activity. Next, the activity (Ei−Er) is compared with an experimentally determined constant a, and if (Ei−Er)<α, the field small blocks are selected, and if (Ei−Er)≧α, the frame small blocks are selected, and then outputted. The constant α may be simply 0. At the same time, the field, frame small block forming circuit 2 outputs also a field, frame selection signal 21 which shows which of the field or frame small blocks are selected. The field, frame selection signal 21 is sent to the decoder together with the output of the block coding circuit 3.

The field or frame small blocks are then coded in the block coding circuit 3 and sent to the transmission line. Here, there are used a DCT circuit 31 and a quantizer 32 as the block coding circuit 3.

According to the above-described apparatus, with respect to a block of large motion, due to large interfield difference, the activity becomes as (Ei−Er)<α, so that the field small blocks are selected. Accordingly, coding can be carried out without suppressing the motion. With respect to a block of little motion, the interfield difference is small, and the activity becomes as (Ei−Er)>α, so that the frame small blocks are selected, and coding can be carried out utilizing the vertical correlation. In other words, it becomes possible to carry out optimum coding according to the local motion of image, and there can be realized coding in high efficiency without depending on the quantity of motion.

Figure 7:
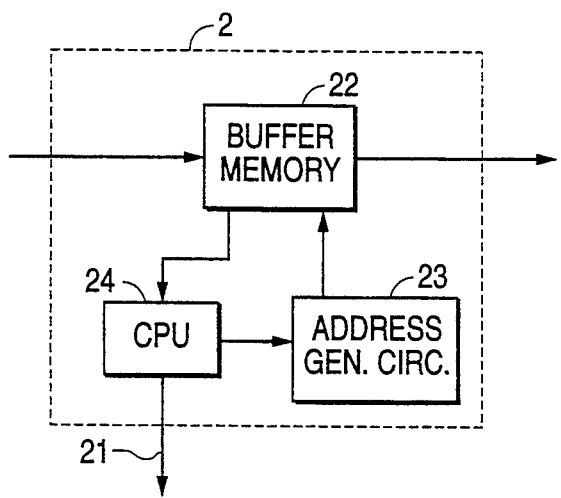
FIGS. 7 and 8 are a detailed block diagram and a flowchart of a circuit for forming the field and frame small blocks of the present invention.

FIG. 7 is an example of a detailed block diagram of the above-mentioned field, frame small block forming circuit 2. In this example, the field, frame small block forming circuit 2 is constituted by a buffer memory 22 for inputting the two-dimensional block and outputting the field or frame small blocks, an address generating circuit 23 for generating an address of the buffer memory 22, and a CPU 24 for calculating the activity, selecting either the field or frame small blocks, and controlling the address generating circuit 23 and buffer memory 22. The CPU 24 outputs also a field, frame selection signal 21 which shows which of the field or frame small blocks are selected.

Figure 8:
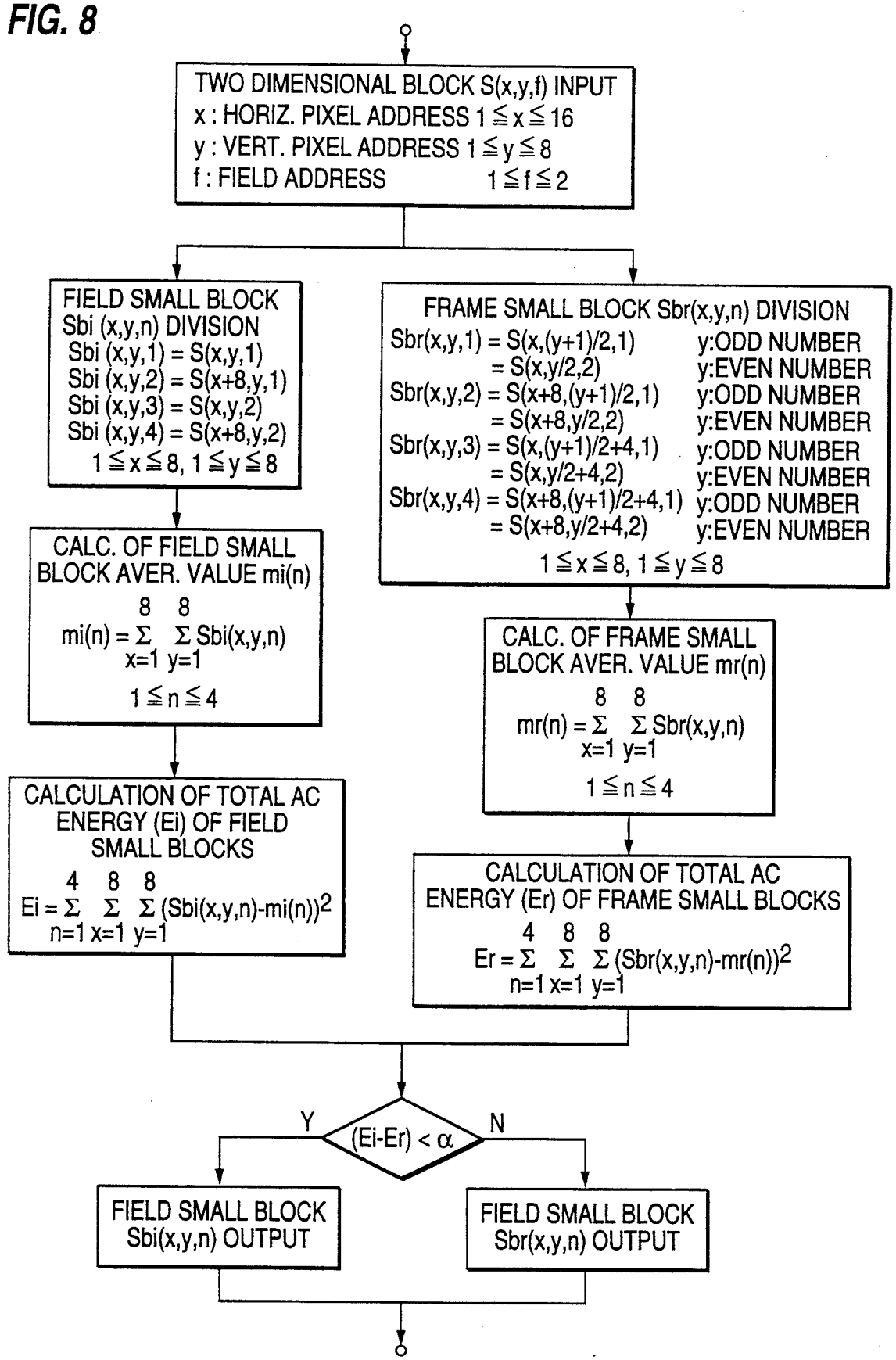

FIG. 8 is a flow chart to shown an example of algorithm of the CPU 24 for carrying out the operations of the third embodiment.

Figure 9:
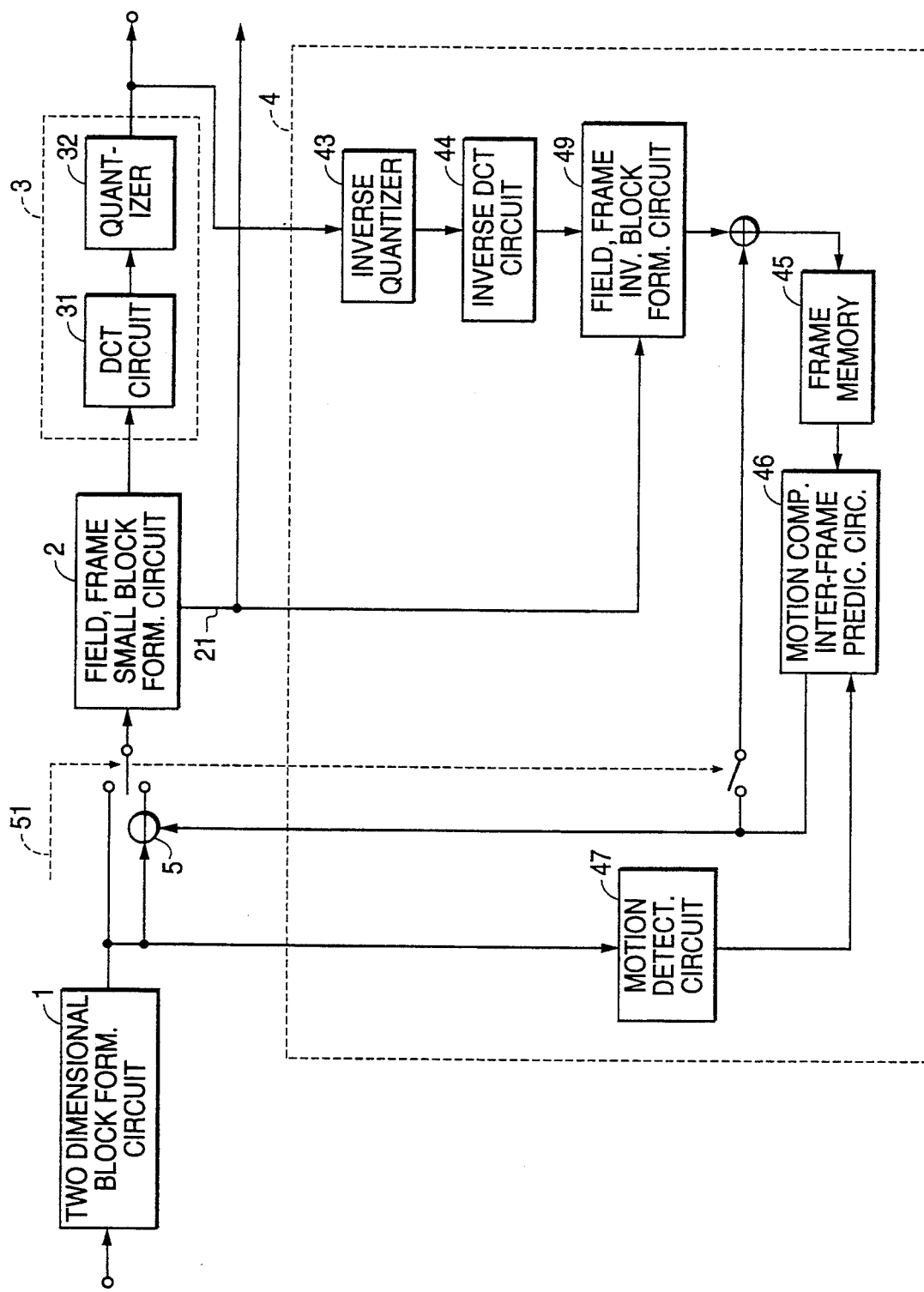
FIG. 9 is a block diagram of an image coding apparatus in a fourth embodiment of the present invention.
Figure 10:
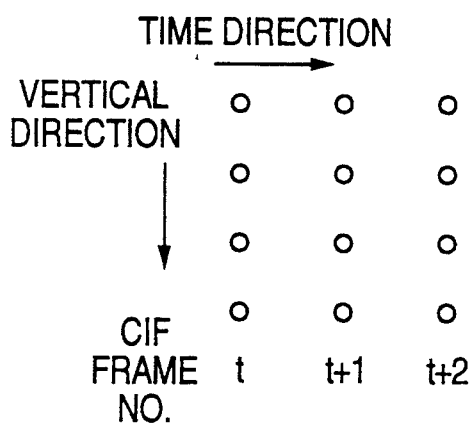
FIGS. 10, 11 and 12 are diagrams for explaining the conventional image coding method.
Figure 11:
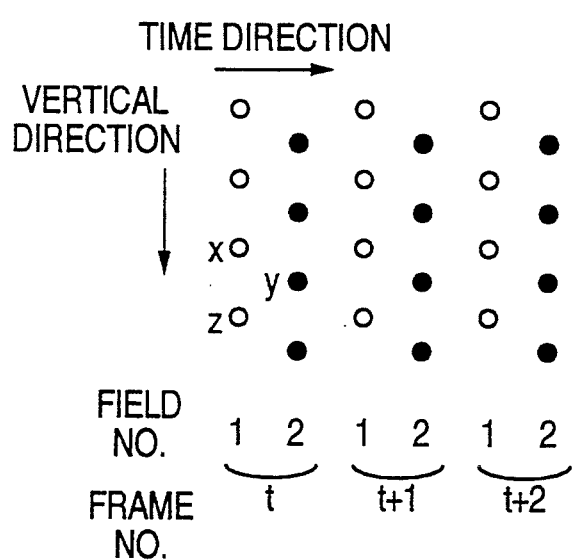
Figure 12:
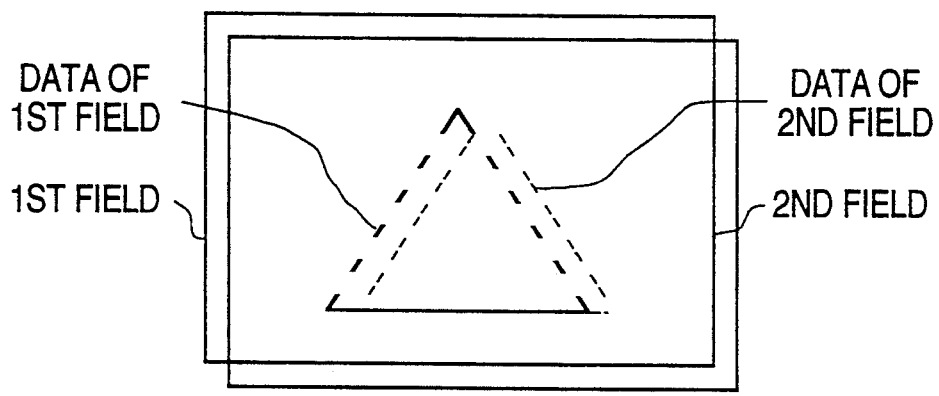

FIG. 9 is a block diagram of an image coding apparatus in the fourth embodiment of the present invention, in which the two-dimensional block forming circuit 1, field, frame small block forming circuit 2, and block coding circuit 3 are the same as those of the third embodiment, and to which there are further added a prediction circuit 4 and a subtractor 5.

With respect to the image coding apparatus constituted as above, explanation will be given below with reference to FIG. 9.

The inputted image is first divided into the two-dimensional blocks by the two-dimensional block forming circuit 2, in the same manner as in the third embodiment. The first frame to be coded is switched to the intra-frame coding according to an intra-frame and inter-frame switching signal 51. The method of intra-frame coding is similar to that of the third embodiment. The difference from the third embodiment is in the point of coding the prediction errors. That is to say, with respect to the second frame and succeeding frames, differences from prediction values outputted from the prediction circuit 4, or prediction errors, are calculated with the subtractor 5 on a two-dimensional block by block basis. Next, the prediction errors obtained as a result of the calculation are divided into either field or frame small blocks, and then subjected to coding. The method of coding the prediction errors is the same as that of the intra-frame coding, i.e., that of the third embodiment. In the prediction circuit 4, using an inverse quantizer 43, an inverse DCT circuit 44, a frame memory 45, a motion compensation inter-frame prediction circuit 46 and a motion detection circuit 47, the prediction value is calculated in the same method as that of the first embodiment. In the present embodiment, due to the division into either the field or frame small blocks, a field, frame inverse block forming circuit 49 for reverting the small blocks to the two-dimensional block is inserted next to the inverse DCT circuit 44.

By constituting the image coding apparatus as above, there can be obtained the effects similar to that of the third embodiment not only in the intra-frame coding but also in the inter-frame coding.

In the foregoing embodiments, explanation was given by taking a DCT circuit as an example of the block coding circuit 3. However, the invention is not limited to it, but any other system using the two-dimensional block may be employed such as an orthogonal transform including Hadamard transformation and Fourier transformation, and vector quantization, etc.

Further, while the first, second, third and fourth embodiments were separately explained, the invention can be realized by combining the first, third and fourth embodiment, or the second, third and fourth embodiment, in which case a further highly efficient coding Can be realized.

I claim:

1. An image coding method comprising the steps of:
   inputting interlaced scanned image data of a plurality of frames;
   dividing said image data in each frame into two-dimensional blocks;
   dividing each of said two-dimensional blocks into field small blocks each containing only data of one of two fields of said each frame and frame small blocks each containing data of both of said two fields;
   calculating an activity of each of said two-dimensional blocks;
   selecting either said field small blocks or said frame small blocks by using said activity as an index to obtain selected small blocks; and
   coding said selected small blocks,
   wherein said step of calculating an activity of each of said two-dimensional blocks comprises the sub-steps of:
   calculating a total AC energy of said field small blocks (Ei) and a total Ac energy of said frame small blocks (Er); and
   calculating, as said activity, an energy difference (Ei−Er) between said total AC energy of said field small blocks (Ei) and said total Ac energy of said frame small blocks (Er), and
   wherein said step of selecting either said field small blocks or said frame small blocks comprises the sub-steps of:
   comparing said energy difference (Ei−Er) with a predetermined constant value ($\alpha$); and
   selecting said field small blocks when said energy difference is smaller than said predetermined constant value and selecting said frame small blocks otherwise.

2. An image coding method comprising the steps of:
   inputting interlaced scanned image data of a plurality of frames;
   dividing said image data in each frame into two-dimensional blocks;
   producing a prediction block with respect to each of said two-dimensional blocks;
   calculating a difference between said prediction block and a corresponding one of said two-dimensional blocks to obtain a prediction error two-dimensional block indicative of said difference;
   dividing said prediction error two-dimensional block into field small blocks each containing only prediction error data of one of two fields of said each frame and frame small blocks each containing prediction error data of both said two fields;
   calculating an activity of said prediction error two-dimensional block;
   selecting either said field small blocks or said frame small blocks by using said activity as an index to obtain selected small blocks; and
   coding said selected small blocks.

3. An image coding method comprising the steps of:
   inputting interlaced scanned image data of a plurality of frames;
   dividing said image data in each frame into two-dimensional blocks;
   producing a prediction block with respect to each of said two-dimensional blocks;
   calculating a difference between said prediction block and a corresponding one of said two-dimensional blocks to obtain a prediction error two-dimensional block indicative of said difference;
   dividing said prediction error two-dimensional block into field small blocks each containing only prediction error data of one of two fields of said each frame and frame small blocks each containing prediction error data of both said two fields;
   calculating an activity of said prediction error two-dimensional block;
   selecting either said field small blocks or said frame small blocks by using said activity as an index to obtain selected small blocks; and
   coding said selected small blocks,
   wherein said step of calculating an activity of said prediction error two-dimensional block comprises the sub-steps of:
   calculating a total AC energy of said field small blocks (Ei) and a total Ac energy of said frame small blocks (Er); and
   calculating, as said activity, an energy difference (Ei−Er) between said total Ac energy of said field small blocks (Ei) and said total AC energy of said frame small blocks (Er), and
   wherein said step of selecting either said field small blocks or said frame small blocks comprises the sub-steps of:
   comparing said energy difference (Ei−Er) with a predetermined constant value ($\alpha$); and
   selecting said field small blocks when said energy difference is smaller than said predetermined constant value and selecting said frame small blocks otherwise.

4. An image coding apparatus comprising:
   a two-dimensional block forming circuit for inputting interlaced scanned image data of a plurality of frames and for dividing said image data in each frame into two-dimensional blocks;
   a small block forming circuit for dividing each of said two-dimensional blocks into field small blocks each containing only data of one of two fields of said each frame and frame small blocks each containing data of both of said two fields, said small block forming circuit including:
   activity calculating means for calculating an activity of each of said two-dimensional blocks by calculating a total AC energy of said field small blocks (Ei) and a total AC energy of said frame small blocks (Er) and calculating, as said activity, an energy difference (Ei−Er) between said total Ac energy of said field small blocks (Ei) and said total AC energy of said frame small blocks (Er); and
   selecting means for comparing said energy difference (Ei−Er) with a predetermined constant value ($\alpha$) and for selecting said field small blocks when said energy difference is smaller than said predetermined constant value and selecting said frame small blocks otherwise, to obtain corresponding selected small blocks; and a block coding circuit for coding said selected small blocks.

5. An image coding apparatus comprising:

a two-dimensional block forming circuit for inputting interlaced scanned image data of a plurality of frames and for dividing said image data in each frame into two-dimensional blocks;

a prediction circuit for producing a prediction block with respect to each of said two-dimensional blocks;

a subtracting circuit for calculating a difference between said prediction block and a corresponding one of said two-dimensional blocks to obtain a prediction error two-dimensional block indicative of said difference;

a small block forming circuit for dividing said prediction error two-dimensional block into field small blocks each containing only prediction error data of one of two fields of said each frame and frame small blocks each containing prediction error data of both of said two fields, said small block forming circuit including activity calculating means for calculating an activity of said prediction error two-dimensional block, and selecting means for selecting either said field small blocks or said frame small blocks by using said activity as an index to obtain selected small blocks; and a block coding circuit for coding said selected small blocks.

6. An image coding apparatus comprising:

a two-dimensional block forming circuit for inputting interlaced scanned image data of a plurality of frames and for dividing said image data in each frame into two-dimensional blocks;

a prediction circuit for producing a prediction block with respect to each of said two-dimensional blocks;

a subtracting circuit for calculating a difference between said prediction block and a corresponding one of said two-dimensional blocks to obtain a prediction error two-dimensional block indicative of said difference;

a small block forming circuit for dividing said prediction error two-dimensional block into field small blocks each containing only prediction error data of one of two fields of said each frame and frame small blocks each containing prediction error data of both of said two fields, said small block forming circuit including:

activity calculating means for calculating an activity of each of said two-dimensional blocks by calculating a total AC energy of said field small blocks ($Ei$) and a total AC energy of said frame small blocks ($Er$) and calculating, as said activity, an energy difference ($Ei-Er$) between said total AC energy of said field small blocks ($Ei$) and said total AC energy of said frame small blocks ($Er$); and selecting means for comparing said energy difference ($Ei-Er$) with a predetermined constant value ($\alpha$) and for selecting said field small blocks when said energy difference is smaller than said predetermined constant value and selecting said frame small blocks otherwise, to obtain corresponding selected small blocks; and a block coding circuit for coding said selected small blocks.

* * * * *